P. B. HARRISON.
BRAKE BEAM.
APPLICATION FILED SEPT. 4, 1909.
956,637.
Patented May 3, 1910.
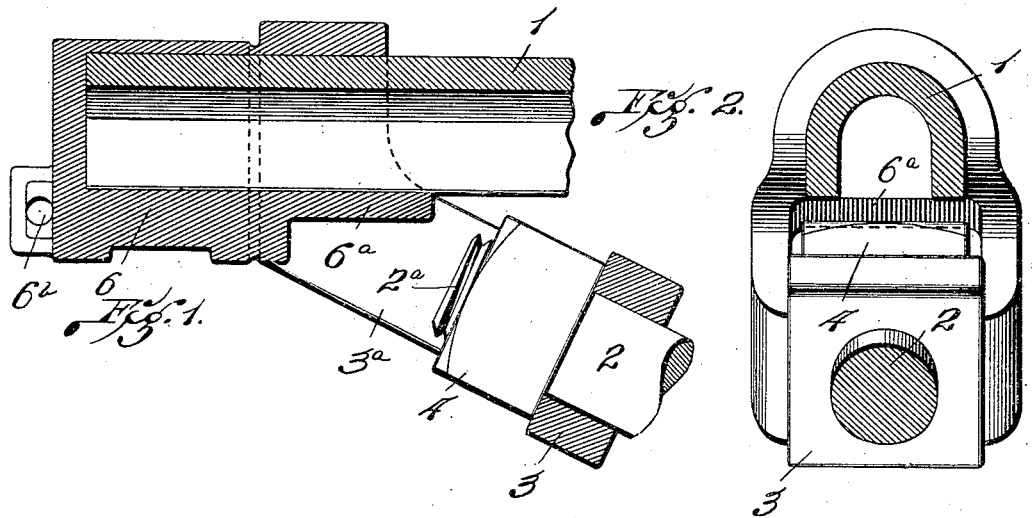
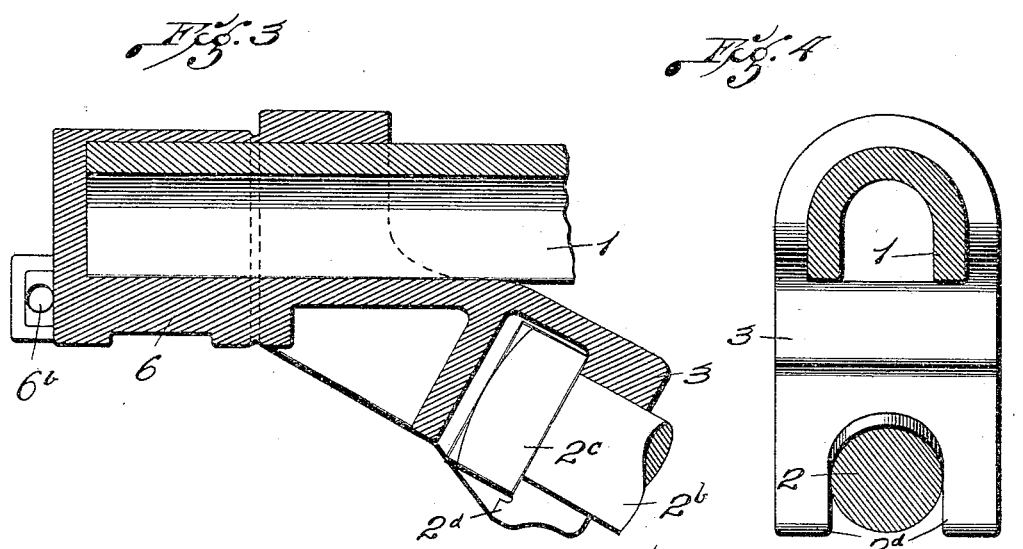
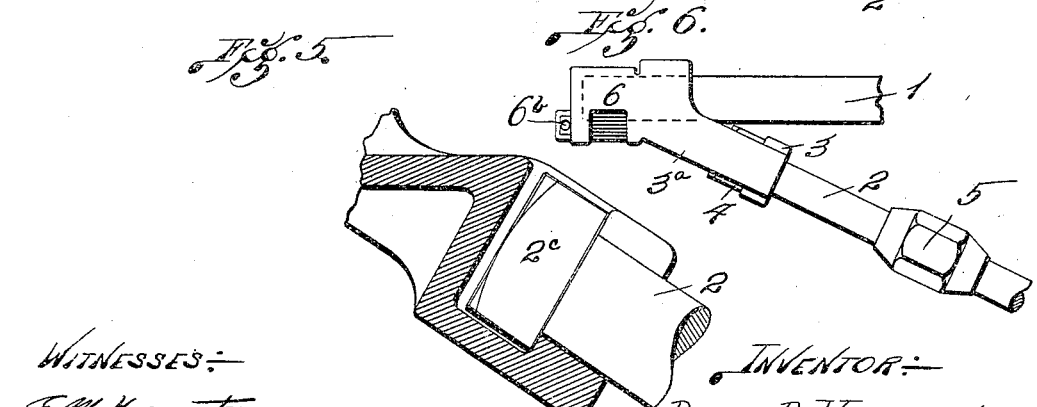
WITNESSES:—
INVENTOR:—
PHILIP B. HARRISON.

UNITED STATES PATENT OFFICE.

PHILIP B. HARRISON, OF CHICAGO, ILLINOIS, ASSIGNOR TO CHICAGO RAILWAY EQUIPMENT COMPANY, OF CHICAGO, ILLINOIS, A CORPORATION OF ILLINOIS.

BRAKE-BEAM.

956,637.  Specification of Letters Patent.  Patented May 3, 1910.

Application filed September 4, 1909. Serial No. 516,282.

*To all whom it may concern:*

Be it known that I, PHILIP B. HARRISON, a citizen of the United States, residing at Chicago, Illinois, have invented a certain new and useful Improvement in Brake-Beams, of which the following is a full, clear, and exact description, such as will enable others skilled in the art to which it appertains to make and use the same, reference being had to the accompanying drawings, forming part of this specification, in which—

Figure 1 is a sectional view through one end of my improved brake beam. Fig. 2 is an end elevational view. Fig. 3 is a sectional view of a modified form. Fig. 4 is an end elevational view of the structure shown in Fig. 3. Fig. 5 is a detail sectional view of another modified form. Fig. 6 is an elevational view of one end of the beam.

This invention relates to a new and useful improvement in brake beams, and is designed particularly for use as a "high speed" brake beam. These so-called "high speed" brake beams are largely used on passenger coaches, sleeping and dining cars.

The object of my present invention is to materially increase the size of the compression and tension members without increasing the size of the sleeve, whereby the brake heads now in use can be employed on my improved beam. In this manner, I am enabled to get a very strong brake beam, that is, one which will show a minimum deflection under a maximum load.

Heretofore, where the size of the so-called sleeve or thrust block is limited to accommodate brake heads of standard size, such as prescribed by the Master Car Builders, the limit of sizes of compression members and tension members, of various forms, where they pass through the thrust block or sleeve, has been reached. Hence, it has been impossible in existing constructions to get heavier forms of compression and tension members through the restricted space allowed, consequently, it has been impossible to supply the demand for stronger and more rigid brake beams where the limitation of size concerning the brake head and sleeve remain the same.

My improved construction, while apparently simple, is most important, as it meets recent requirements for increased efficiency in brake beam construction. It is possible, according to my invention to increase the size of the short tension rod, without interfering with the other dimensions, which enables me to get a brake beam of any required capacity. According to the requirements of the new Westinghouse brake, the brake beam must stand a load of forty two thousand (42,000) pounds, with one sixteenth of an inch (1/16") deflection. This has been thought impossible of attainment, on account of the limitation of the fixed dimensions. In my construction, I can use a tension rod as large in diameter as desired and increase the size of the compression member, as desired.

In the drawings, 1 indicates the compression member, and 2 the tension member, whose end section $2^a$, in Fig. 1, is threaded to pass through the eye of the stirrup or yoke 3, and into a nut 4, which is held against rotation by the legs of the stirrup. The opposite end of the end section $2^a$ is connected to the tension rod proper by a turn buckle or a nut 5 having right and left hand threads. Any suitable means may be employed, if desired, to prevent the turn buckle or the end section from turning.

6 is a thrust block in which the end of the compression member is seated, said thrust block constituting a mount for the brake head, which may be of the well known adjustable type. This thrust block has inwardly extending reinforcing walls $6^a$, to which are integrally connected the legs $3^a$ of the tension rod yoke.

In assembling the parts, the ends of the compression member are seated in the thrust block and the tension member arranged in position. There is also a strut provided, which strut is not shown. The end section $2^a$, or the turn buckle, as the case may be, at each end of the tension rod, is now screwed up so as to place the proper camber in the compression member. When the head is placed on the beam, a cotter pin may be arranged in the opening $6^b$ to prevent displacement of the head.

In Fig. 3 I have shown a modified form of tension rod connection, in which, instead of passing the threaded end of the end section of the tension rod through an opening in a stirrup or yoke, and into a nut, said tension rod end section $2^b$ is provided with a head $2^c$ which is arranged in a socket opening and prevented from accidental displacement from its seat by means of lips $2^d$.

In Fig. 5 the socket to receive the head on the end of the tension member opens outwardly, while in Fig. 3 said socket is shown as opening inwardly.

I claim:

1. In a brake beam, the combination with a compression member, of a thrust block having inwardly extending walls or legs, whose extremities are connected by a seat member, a tension rod having a shouldered portion in engagement with said seat member and means for placing tension in said tension member.

2. In a brake beam, the combination with a compression member, of a thrust block having a stirrup member extending inwardly from said thrust block in alinement with the tension member, and a tension member connected to said stirrup.

3. In a brake beam, the combination with a compression member, of a thrust block, inwardly extending walls or legs, whose extremities are connected by a seat member, a tension member with a head on its end in engagement with said seat member and means for placing tension in said tension member.

4. In a brake beam, the combination with a compression member, of a thrust block, inwardly extending walls or legs, whose extremities are connected by a seat member, and a tension member having an adjustable nut on its end in engagement with the said seat member.

5. A thrust block for brake beams, provided with a seat for a compression member, and a stirrup-like extension for attachment of the tension member.

6. A thrust block for brake beams, provided with a seat for a compression member, and a stirrup-like extension for the attachment of a tension member, said thrust block providing a mount for the brake head and having inwardly extending reinforcing members to coöperate with the compression member.

7. In a brake beam, the combination with a compression member, of a thrust block having an inward extension, and a sectional tension member, whose end section is connected to said inward extension.

8. In a brake beam, the combination with a compression member, of a thrust block having an inward extension, a sectional tension member having a shouldered head in engagement with said extension, and means interposed between the sections of said tension member for shortening the same.

9. In a brake beam, the combination with a compression member, a thrust block having a seat, a sectional tension member having a shouldered head in engagement with said seat, means for preventing accidental displacement of said head from said seat, and means between the sections of the tension rod for shortening the same.

In testimony whereof I hereunto affix my signature in the presence of two witnesses, this 7th day of August 1909.

PHILIP B. HARRISON.

Witnesses:
EDWARD T. WALKER,
JOSEPH W. WEINLAND.